United States Patent
Bradley

[19]

[11] Patent Number: 5,888,387
[45] Date of Patent: Mar. 30, 1999

[54] FISH TANK FILTER

[76] Inventor: David M. Bradley, 1824 Meadow St., McKeesport, Pa. 15132

[21] Appl. No.: 121,331
[22] Filed: Jul. 23, 1998
[51] Int. Cl.[6] .................................................. A01K 63/04
[52] U.S. Cl. .......................... 210/169; 119/259; 210/169; 210/232; 210/282; 210/416.2
[58] Field of Search ................................ 210/416.2, 169, 210/232, 282; 119/259

[56] References Cited

U.S. PATENT DOCUMENTS

| | | | |
|---|---|---|---|
| 2,828,019 | 3/1958 | Lambertson | 210/416.2 |
| 3,487,935 | 1/1970 | Lovitz | 210/169 |
| 4,820,410 | 4/1989 | Cavalcante | 210/416.2 |
| 5,294,335 | 3/1994 | Chiang | 210/232 |
| 5,336,401 | 8/1994 | Tu | 210/416.2 |

*Primary Examiner*—Jay H. Woo
*Assistant Examiner*—Frank Lawrence

[57] ABSTRACT

A fish filter is provided including a mounting assembly mounted on a fish tank. Also included is a filter situated within the mounting assembly. The filter has filtering material situated therein. At least one vertical pipe extends from the filter on a first side of the filtering material. Further, an output is positioned on a second side of the filtering material. Situated within the fish tank is a pump which is connected to the filter for suctioning water through the vertical pipe and the filtering material.

9 Claims, 5 Drawing Sheets

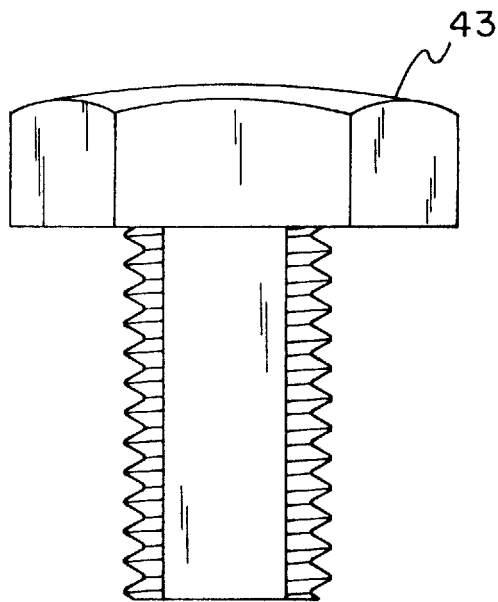
FIG. 3
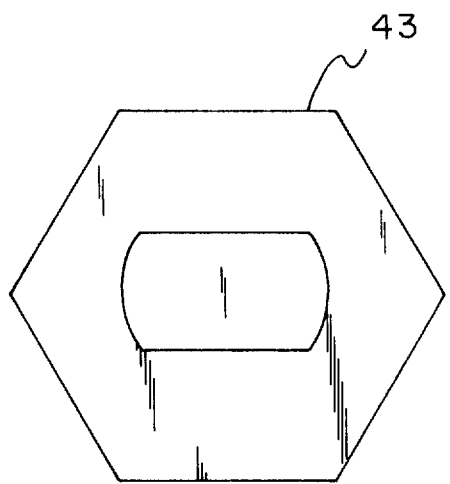
FIG. 4
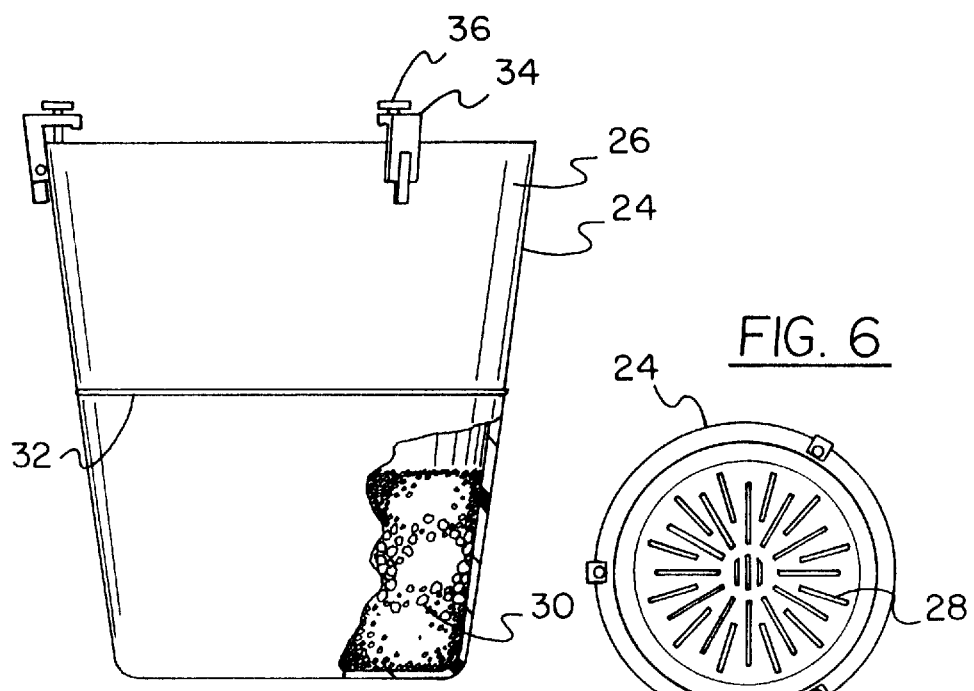
FIG. 5
FIG. 6

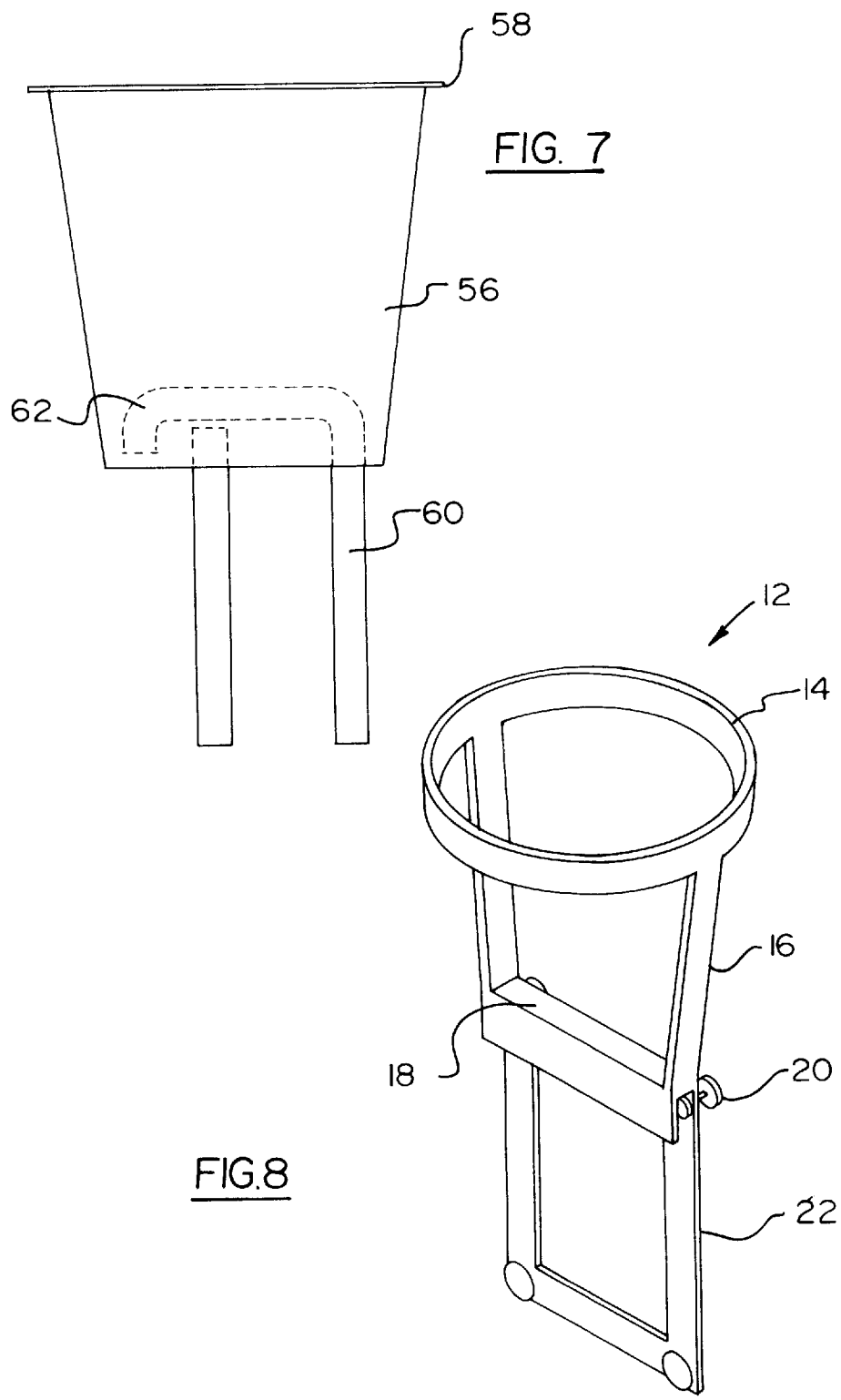

FISH TANK FILTER

BACKGROUND OF THE INVENTION

1. Field of the Invention

The present invention relates to water filtering systems and more particularly pertains to a new fish tank filter for filtering water within a fish tank.

2. Description of the Prior Art

The use of water filtering systems is known in the prior art. More specifically, water filtering systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art water filtering systems include U.S. Pat. No. 5,401,401; U.S. Pat. No. 5,453,182; U.S. Pat. No. 5,290,436; U.S. Pat. No. 5,188,516; U.S. Pat. Des. 319,487; and U.S. Pat. No. 5,176,824.

In these respects, the fish tank filter according to the present invention substantially departs from the conventional concepts and designs of the prior art, and in so doing provides an apparatus primarily developed for the purpose of filtering water within a fish tank.

SUMMARY OF THE INVENTION

In view of the foregoing disadvantages inherent in the known types of water filtering systems now present in the prior art, the present invention provides a new fish tank filter construction wherein the same can be utilized for filtering water within a fish tank.

The general purpose of the present invention, which will be described subsequently in greater detail, is to provide a new fish tank filter apparatus and method which has many of the advantages of the water filtering systems mentioned heretofore and many novel features that result in a new fish tank filter which is not anticipated, rendered obvious, suggested, or even implied by any of the prior art water filtering systems, either alone or in any combination thereof.

To attain this, the present invention generally comprises a mounting assembly. As shown in FIG. 8, the mounting assembly has an annular member with a pair of generally vertical bars integrally coupled to diametrically opposed sides of the annular member and extending downwardly and inwardly therefrom. A cross bar is integrally connected between bottom ends of the vertical bars with an inverted U-shaped cross-section along a length thereof. As such, the cross bar defines a slot with an open bottom to releasably receive an upper peripheral edge of a fish tank. A pair of set screws are mounted on the cross bar for engaging the fish tank thereby maintaining the annular member in a horizontal plane above the fish tank. The mounting assembly includes a stabilizer integrally coupled to the cross bar and extended downwardly therefrom with a pair of suction cups for releasably securing to a side face of the fish tank. Next provided is a filter unit including a housing having an inverted frusto-conical configuration with an open top face and a bottom face. As shown in FIG. 6, the bottom face of the filter unit is equipped with a plurality of radially extending slits formed therein. The filter unit further includes a predetermined amount of filtering material situated within an interior space of the housing. See FIG. 5. An O-ring is coupled to an outer surface of the housing at a central extent thereof, for reasons that will soon become apparent. The filter unit further includes a plurality of clamps each with an L-shaped configuration. Such clamps are coupled about a periphery of the top face in a spaced relationship. Each clamp has a vertical extent having a bottom hingably coupled to the outer surface of the housing adjacent to the open top thereof. Associated therewith is a horizontal extent with a vertically oriented set screw coupled thereto. FIG. 2 best shows a cover having a disk-shaped configuration with an upwardly extending peripheral lip. The cover also has a downwardly extending peripheral lip with an O-ring mounted thereon. A breathing aperture is formed in a top face of the cover. Also mounted to the top face of the cover is an inlet conduit with an inverted U-shaped configuration. The inlet conduit includes a first vertical portion situated in concentric relationship with the cover. Such first vertical portion of the inlet conduit further has a pair of diametrically opposed V-shaped cut outs formed therein just below the cover. A second vertical portion has a plurality of vertically spaced, concentric O-rings mounted thereon for releasably coupling with a flexible tube. As shown in FIG. 1, this flexible tube is in turn coupled to a pump situated within the fish tank for suctioning water therefrom. In use, the cover is removably secured to the open top of the filter unit such that the clamps are releasably secured to the upwardly extending lip of the cover. FIG. 7 shows an outer filter sleeve having an inverted frusto-conical configuration with an open top face and a bottom face. The filter sleeve has a radially extending upper peripheral lip for gripping purposes. A pair of rigid vertical pipes are coupled to the bottom face of the outer filter sleeve. As shown in FIG. 7, the vertical pipes extend both above and below the bottom face. A siphon tube with an inverted U-shaped configuration has a first end coupled to a top of one of the vertical pipes. By this coupling, a second end of such siphon tube resides above the bottom face of the touter filter sleeve. In operation, the outer filter sleeve is situated within the annular member of the mounting assembly. Further, the filter unit is sealingly situated within the outer filter sleeve such that the bottom face thereof is situated just above the siphon tube of the outer filter sleeve. Note FIG. 1. By this structure, water is suctioned from the inlet conduit and through the filter unit for filtering purposes. For restricting the flow of water through the vertical pipe of the outer filter sleeve, a vertical pipe attachment is provided. The vertical pipe attachment has a cylindrical configuration with an open top for coupling with the bottom ends of the vertical pipes of the outer filter cover. A closed bottom and a periphery each have a plurality of longitudinal slots formed therein for allowing the flow of water therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish tank filter apparatus and method which has many of the advantages of the water filtering systems mentioned heretofore and many novel features that result in a new fish tank filter which is not anticipated, rendered obvious, suggested, or even implied by any of the prior art water filtering systems, either alone or in any combination thereof.

It is another object of the present invention to provide a new fish tank filter which may be easily and efficiently manufactured and marketed.

It is a further object of the present invention to provide a new fish tank filter which is of a durable and reliable construction.

An even further object of the present invention is to provide a new fish tank filter which is susceptible of a low cost of manufacture with regard to both materials and labor, and which accordingly is then susceptible of low prices of sale to the consuming public, thereby making such fish tank filter economically available to the buying public.

Still yet another object of the present invention is to provide a new fish tank filter which provides in the apparatuses and methods of the prior art some of the advantages thereof, while simultaneously overcoming some of the disadvantages normally associated therewith.

Still another object of the present invention is to provide a new fish tank filter for filtering water within a fish tank.

Even still another object of the present invention is to provide a new fish tank filter that includes a mounting assembly mounted on a fish tank. Also included is a filter situated within the mounting assembly. The filter has filtering material situated therein. At least one vertical pipe extends from the filter on a first side of the filtering material. Further, an output is positioned on a second side of the filtering material. Situated within the fish tank is a pump which is connected to the filter for suctioning water through the vertical pipe and the filtering material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the breathing aperture bolt of the present invention.

FIG. 4 is a bottom view of the bolt of FIG. 3.

FIG. 5 is a side sectional view of the filter unit of the present invention.

FIG. 6 is a bottom view of the filter unit of the present invention.

FIG. 7 is a side view of the outer filter sleeve of the present invention.

FIG. 8 is a perspective view of the mounting assembly.

DESCRIPTION OF THE PREFERRED EMBODIMENT

Figure 1:
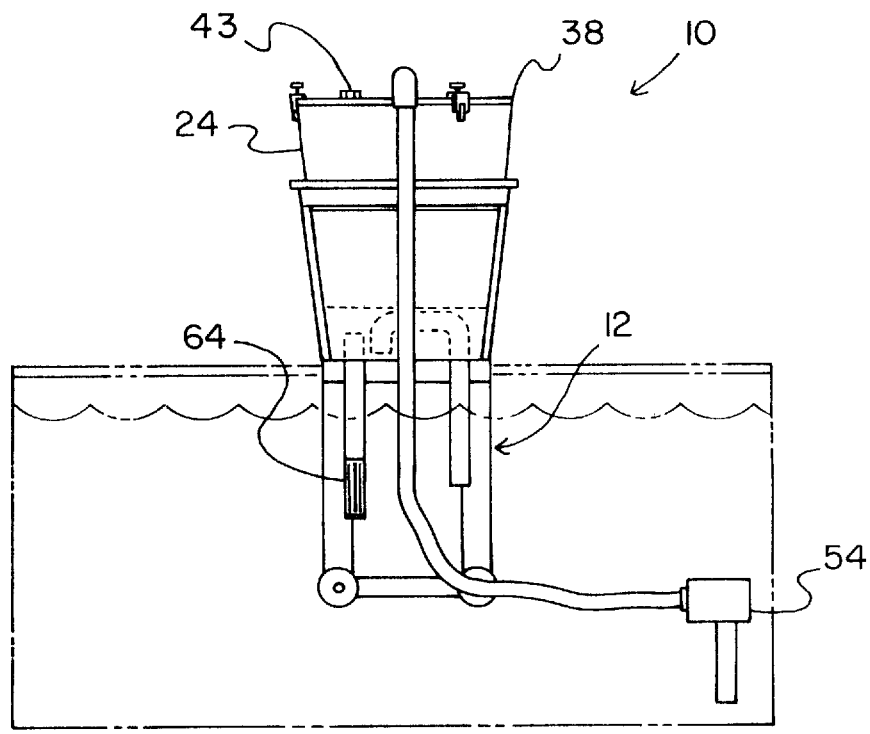
FIG. 1 is a side view of a new fish tank filter according to the present invention.

With reference now to the drawings, and in particular to FIGS. 1 through 10 thereof, a new fish tank filter embodying the principles and concepts of the present invention and generally designated by the reference numeral 10 will be described.

The present invention, designated as numeral 10, includes a mounting assembly 12. As shown in FIG. 8, the mounting assembly has an annular member 14 with a pair of generally vertical bars 16 integrally coupled to diametrically opposed sides of the annular member and extending downwardly and inwardly therefrom. A cross bar 18 is integrally connected between bottom ends of the vertical bars with an inverted U-shaped cross-section along a length thereof. As such, the cross bar defines a slot with an open bottom to releasably receive an upper peripheral edge of a fish tank. A pair of set screws 20 are mounted on the cross bar for engaging the fish tank thereby maintaining the annular member in a horizontal plane above the fish tank.

The mounting assembly further includes a stabilizer 22 integrally coupled to the cross bar and extended downwardly therefrom. The stabilizer includes a pair of vertical arms with a bottom horizontal member connected therebetween. A pair of suction cups are mounted to the horizontal member for releasably securing to a side face of the fish tank.

Next provided is a filter unit 24 including a housing 26 having an inverted frusto-conical configuration with an open top face and a bottom face. As shown in FIG. 6, the bottom face of the filter unit is equipped with a plurality of radially extending slits 28 formed therein. The filter unit further includes a predetermined amount of filtering material 30 situated within an interior space of the housing. See FIG. 5. Such filtering material may take the form of charcoal, zeolite or the like. An O-ring 32 is coupled to an outer surface of the housing at a central extent thereof, for reasons that will soon become apparent.

The filter unit further includes a plurality of clamps 34 each with an L-shaped configuration. Such clamps are coupled about a periphery of the top face in a spaced relationship. Each clamp has a vertical extent having a bottom hingably coupled to the outer surface of the housing adjacent to the open top thereof. Associated therewith is a horizontal extent with a vertically oriented set screw 36 coupled thereto.

Figure 2:
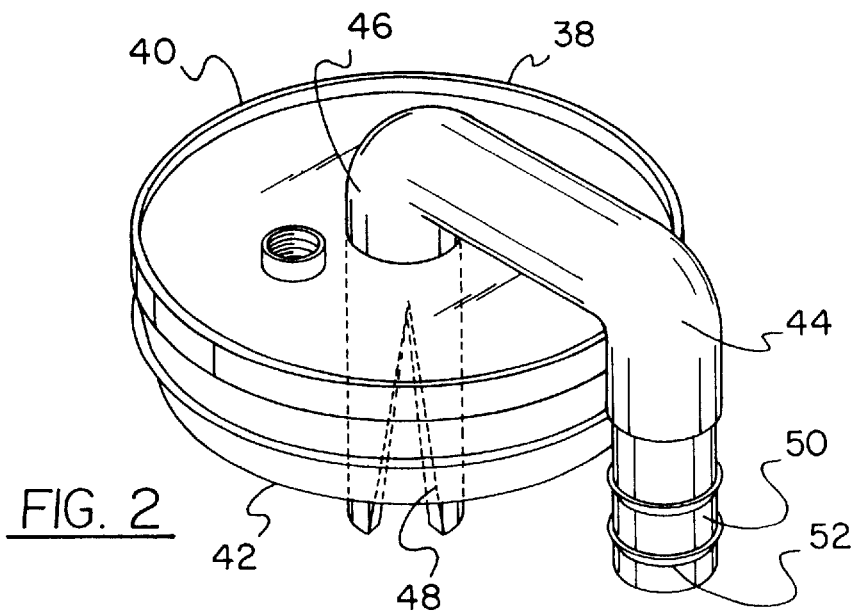
FIG. 2 is a perspective view of the cover of the present invention.
Figure 9:
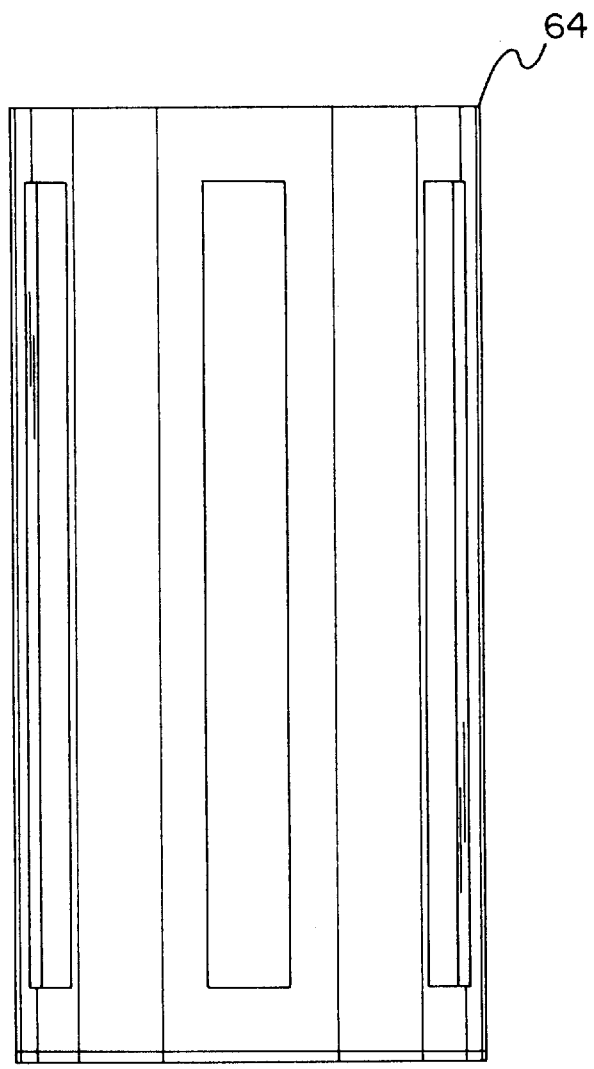
FIG. 9 is a side view of the vertical pipe attachment of the present invention.
Figure 10:
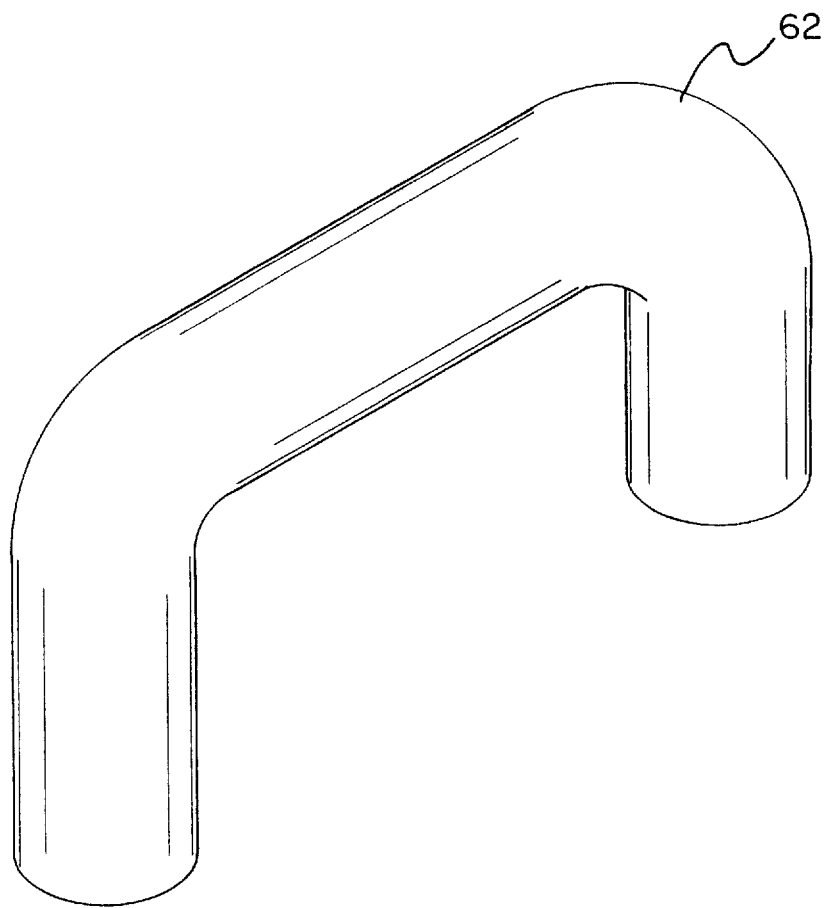
FIG. 10 is a side view of the siphon tube of the present invention.

FIG. 2 best shows a cover 38 having a disk-shaped configuration with an upwardly extending peripheral lip 40. The cover also has a downwardly extending peripheral lip 42 with an O-ring mounted thereon. A breathing aperture is formed in a top face of the cover. Such breathing aperture is selectively opened by way of a bolt 43, as shown in FIGS. 3 & 4. As shown in such Figures, the bolt has a bottom extent with a rectangular configuration.

Also mounted to the top face of the cover is an inlet conduit 44 with an inverted U-shaped configuration. The inlet conduit includes a first vertical portion 46 situated in concentric relationship with the cover. Such first vertical portion of the inlet conduit further has a pair of diametrically opposed V-shaped cut outs 48 formed therein just below the cover. A second vertical portion 50 has a plurality of vertically spaced, concentric O-rings 52 mounted thereon for releasably coupling with a flexible tube. As shown in FIG. 1, this flexible tube is in turn coupled to a pump 54 situated within the fish tank for suctioning water therefrom. As an option, various sized adapters may be employed to allow the use of any pump. In use, the cover is removably secured to the open top of the filter unit such that the clamps are releasably secured to the upwardly extending lip of the cover.

FIG. 7 shows an outer filter sleeve 56 having an inverted frusto-conical configuration with an open top face and a bottom face. The filter sleeve has a radially extending upper peripheral lip 58 for gripping purposes. A pair of rigid vertical pipes 60 are coupled to the bottom face of the outer filter sleeve. As shown in FIG. 7, the vertical pipes extend both above and below the bottom face. A siphon tube 62 with an inverted U-shaped configuration has a first end coupled to a top of one of the vertical pipes. By this coupling, a second end of such siphon tube resides above the bottom face of the outer filter sleeve.

In operation, the outer filter sleeve is situated within the annular member of the mounting assembly. Further, the filter unit is sealingly situated within the outer filter sleeve such that the bottom face thereof is situated just above the siphon tube of the outer filter sleeve. Note FIG. 1. By this structure, water is suctioned from the inlet conduit and through the filter unit for filtering purposes. If, per chance, a young small fish is suctioned into the housing of the filter unit, the small fish is maintained in an upper extent of the housing which defines a minnow catch. It should be noted that small fish may also be intentionally stored in the minnow catch. As an option, an upper extent of the outer filter sleeve and the upper extent of the filter unit may be transparent for allowing a user to monitor the small fish.

For restricting the flow of water through one of the vertical pipes of the outer filter sleeve, a vertical pipe attachment 64 is provided. The vertical pipe attachment has a cylindrical configuration with a closed bottom and an open top for coupling with the bottom end of one of the vertical pipes of the outer filter cover. The vertical pipe attachment further has a periphery with a plurality of longitudinal slots formed therein for allowing the limited flow of water therethrough.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish tank filter comprising, in combination:

a mounting assembly including an annular member with a pair of generally vertical bars integrally coupled to diametrically opposed sides of the annular member and extending downwardly and inwardly therefrom, a cross bar integrally connected between bottom ends of the vertical bars with an inverted U-shaped cross-section along a length thereof for defining a slot with an open bottom to releasably receive an upper peripheral edge of a fish tank, a pair of set screws mounted on the cross bar for engaging the fish tank thereby maintaining the annular member in a horizontal plane above the fish tank, and a stabilizer integrally coupled to the cross bar and extending downwardly therefrom with a pair of suction cups for releasably securing to a side face of the fish tank;

a filter unit including a housing having an inverted frusto-conical configuration with an open top face and a bottom face with a plurality of radially extending slits formed therein, the filter unit further including a predetermined amount of filtering material situated within an interior space of the housing, an O-ring coupled to an outer surface of the housing at a central extent thereof, and a plurality of clamps each with an L-shaped configuration coupled about a periphery of the top face, each clamp including a vertical extent having a bottom hingably coupled to the outer surface of the housing adjacent to the open top thereof and a horizontal extent with a vertically oriented set screw coupled thereto;

a cover having a disk-shaped configuration with an upwardly extending peripheral lip and a downwardly extending peripheral lip with an O-ring mounted thereon, the cover further including a breathing aperture formed in a top face thereof and an inlet conduit with an inverted U-shaped configuration mounted to the top face of the cover, the inlet conduit including a first vertical portion situated in concentric relationship with the cover and having a pair of diametrically opposed V-shaped cut outs formed therein just below the cover and a second vertical portion with a plurality of vertically spaced, concentric O-rings mounted thereon for releasably coupling with a flexible tube which in turn is coupled to a pump situated within the fish tank for suctioning water therefrom, wherein the cover is removably secured to the open top of the filter unit such that the clamps are releasably secured to the upwardly extending lip of the cover;

an outer filter sleeve having an inverted frusto-conical configuration with an open top face and a bottom face, the filter sleeve having a radially extending upper peripheral lip for gripping purposes, a pair of rigid vertical pipes coupled to the bottom face of the outer filter sleeve and extending both above and below said bottom face, a siphon tube with an inverted U-shaped configuration with a first end coupled to a top of one of the vertical pipes and a second end residing just above the bottom face of the outer filter sleeve, wherein the outer filter sleeve is situated within the annular member of the mounting assembly and the filter unit is sealingly situated within the outer filter sleeve such that the bottom face thereof is situated just above the siphon tube of the outer filter sleeve, whereby water is suctioned from the inlet conduit and through the filter unit for filtering purposes; and a vertical pipe attachment having a cylindrical configuration with an open top for coupling with the bottom ends of the vertical pipes of the outer filter cover, a closed bottom and a periphery with a plurality of longitudinal slots formed therein for allowing the flow of water therethrough.

2. A fish tank filter comprising:

a mounting assembly including a substantially annular member with a pair of substantially vertical bars integrally coupled to diametrically opposed sides of the annular member and extending downwardly and inwardly therefrom, a cross bar integrally connected between bottom ends of the vertical bars with a cross-section which defines a slot with an open bottom adapted to releasably receive an upper peripheral edge of a fish tank, and at least one screw mounted on the cross bar for engaging the fish tank thereby maintaining the annular member in a horizontal plane above the fish tank;

filter means situated within the mounting assembly and including filtering material, at least one vertical pipe extending from the filter means on a first side of the filtering material and an output situated on a second side of the filtering material; and a pump situated within the fish tank and connected to the filter means for suctioning water through the vertical pipe and the filtering material.

3. A fish tank filter as set forth in claim 2 wherein the filter means is removably situated within the mounting assembly.

4. A fish tank filter as set forth in claim 2 wherein the filter means includes an outer filter sleeve and a filter unit removably situated therein.

5. A fish tank filter as set forth in claim 2 wherein the filter means includes a removable top.

6. A fish tank filter as set forth in claim 2 wherein the mounting assembly further includes at least one suction cup for engaging the fish tank.

7. A fish tank filter as set forth in claim 2 wherein the vertical pipe of the filter means has a siphon tube situated thereon which has an opening directed away from the filtering material.

8. A fish tank filter as set forth in claim 2 wherein the filter means includes a breathing aperture situated thereon.

9. A fish tank filter comprising, in combination:

a mounting assembly adapted for releasably securing to a fish tank;

a filter unit including a housing having a substantially inverted frusto-conical configuration with an open top face and a bottom face with a plurality of apertures formed therein, the filter unit further including a predetermined amount of filtering material situated within an interior space of the housing and an O-ring coupled to an outer surface of the housing;

a cover with an inlet conduit adapted for being removably secured to the open top face of the filter unit;

an outer filter sleeve having a substantially inverted frusto-conical configuration with an open top face and a bottom face, the outer filter sleeve having at least one substantially vertical pipe coupled to the bottom face thereof and a siphon tube with a substantially inverted U-shaped configuration having a first end coupled to a top of the vertical pipe and a second end residing just above the bottom face of the outer filter sleeve;

wherein the outer filter sleeve is adapted for being secured to the mounting assembly and the filter unit is adapted for being sealingly situated within the outer filter sleeve such that the bottom face thereof is situated above the siphon tube of the outer filter sleeve, whereby water may be suctioned from the inlet conduit and through the filter unit for filtering purposes.

* * * * *